US007584176B2

(12) United States Patent
Chen et al.

(10) Patent No.: US 7,584,176 B2
(45) Date of Patent: Sep. 1, 2009

(54) METHODS AND APPARATUSES TO CANCEL QUERY

(75) Inventors: Jing Chen, San Mateo, CA (US); Denis Tyrell, Livermore, CA (US); Tony Kam Wong, San Francisco, CA (US); Qiang Sun, Belmont, CA (US); Jinghuan Jay Lu, San Ramon, CA (US)

(73) Assignee: Siebel Systems, Inc., San Mateo, CA (US)

( * ) Notice: Subject to any disclaimer, the term of this patent is extended or adjusted under 35 U.S.C. 154(b) by 320 days.

(21) Appl. No.: 11/048,837

(22) Filed: Feb. 1, 2005

(65) Prior Publication Data

US 2005/0203890 A1     Sep. 15, 2005

Related U.S. Application Data

(60) Provisional application No. 60/552,271, filed on Mar. 10, 2004.

(51) Int. Cl.
G06F 7/00         (2006.01)
(52) U.S. Cl. ................................ 707/3; 707/10; 709/217
(58) Field of Classification Search ...................... 707/3, 707/10; 709/217
See application file for complete search history.

(56) References Cited

U.S. PATENT DOCUMENTS

| | | | | |
|---|---|---|---|---|
| 6,496,833 | B1 | 12/2002 | Goldberg et al. | ............ 707/102 |
| 6,504,847 | B1 * | 1/2003 | Horlander | .................... 370/431 |
| 7,155,612 | B2 * | 12/2006 | Licis | ........................... 713/182 |
| 7,209,915 | B1 * | 4/2007 | Taboada et al. | ................. 707/3 |
| 2002/0123984 | A1 | 9/2002 | Prakash | .......................... 707/1 |
| 2002/0199018 | A1 | 12/2002 | Diedrich et al. | ............. 709/245 |
| 2003/0070005 | A1 | 4/2003 | Mukundan et al. | |
| 2003/0145006 | A1 * | 7/2003 | Dalfsen et al. | ................. 707/10 |
| 2004/0172385 | A1 * | 9/2004 | Dayal | ............................ 707/3 |

OTHER PUBLICATIONS

Lakshman, Bulusu. Oracle Developer Forms Techniques. Sams Publishing. Feb. 18, 2000. Chapter 8: Additional Interesting Techniques.*
Laksman, Bulusu. Oracle Developer Forms Techniques. Sams Publishing. Feb. 18, 2000. Chapter 8: Additional Interesting Techniques.*

* cited by examiner

*Primary Examiner*—John R. Cottingham
*Assistant Examiner*—Alexandria Y Bromell
(74) *Attorney, Agent, or Firm*—Campbell Stephenson LLP (57) ABSTRACT

Methods and apparatuses to cancel database queries from a web application user interface in a networked database application. In one embodiment, the method includes receiving a user request to cancel a query previously sent to a database and calling an application programming interface (API) provided by the database to terminate one or more statements running on the database, the one or more statements being related to the query.

17 Claims, 9 Drawing Sheets

METHODS AND APPARATUSES TO CANCEL QUERY

The present application claims the benefit of the filing date of U.S. Provisional Application Ser. No. 60/552,271, filed Mar. 10, 2004, and entitled "A Method and an Apparatus to Cancel Database Query" by the inventors Jing Chen, Denis Tyrell, Tony Wong, Qiang Sun, Jay Lu, which is incorporated here by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright Siebel Systems, Inc., 2005.

TECHNOLOGY FIELD

At least some embodiments of the present invention relate to networked database applications, and more particularly but not exclusively to the cancellation of one or more database queries.

BACKGROUND

Many networked database applications use database engines to manage data storage and retrieval. Database engines can be in the form of servers which accept communication connections, receive instructions over the communication connections, perform database operations according to the instructions and return results over the communication connections. Database engines may also be embedded into application programs so that the database engines run as part of the application processes.

The response time for a query in a database engine varies, depending on the database size, the complexity of the query, the workload of the database engine, etc. Some queries can take such long periods of response time that a user may want to stop waiting for the response.

Some database engines are capable of accepting instructions to cancel previously received query tasks. Some database engines can automatically cancel the queries that were previously submitted over a communication connection when the communication connection is broken.

Web browsers and the Internet provide a portable and versatile way to provide user interfaces. Many web-based database applications have been developed to utilize web browser and web servers to implement user interfaces across web links. In a typical web-based database application, one or more clients are coupled to a database via a web server and an application server. The clients may include a browser window and an application running in the browser window. Users may input requests to the client in order to access or to query the database. The client communicates with the web server; the web server then communicates with the application server which uses the database engine to perform queries.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

Some queries running on a database may take a long time to return results. Often users would like to cancel the query midway through the operation. The users can stop the browser from waiting for the query result at the client side. For example, in a traditional web based database application, one may stop the browser from waiting for the query result midway through the operation by closing the browser window and restarting the application. However, restarting the application can be inconvenient for the user since the user has to perform extra operations to return to the spot in the application prior to closing the browser window.

Although stopping the browser from waiting for the query result appears to cancel the query in the user's point of view, the query activities on the server and the database are not stopped. The query activities are still running on the server and/or the database to produce results that are eventually discarded. Obtaining the eventually discarded query results causes unnecessary consumption of system resources, and consequently, slowing down other operations running on the server and/or the database.

Slowing down the server may cause the users to contact the system administrator and to report the slowing down of other operations. Upon checking the system, the administrator may determine that the statements that are still running on the database for the canceled queries are responsible for slowing down the server. Then, the administrator may perform operations to cancel such statements.

According to one embodiment of the present invention, the users can directly cancel the query activities on the server and/or the database. When the user aborts a query, the server and/or the database also stop the corresponding query activities. Thus, system resources can be saved for improved overall performance.

Figure 1:
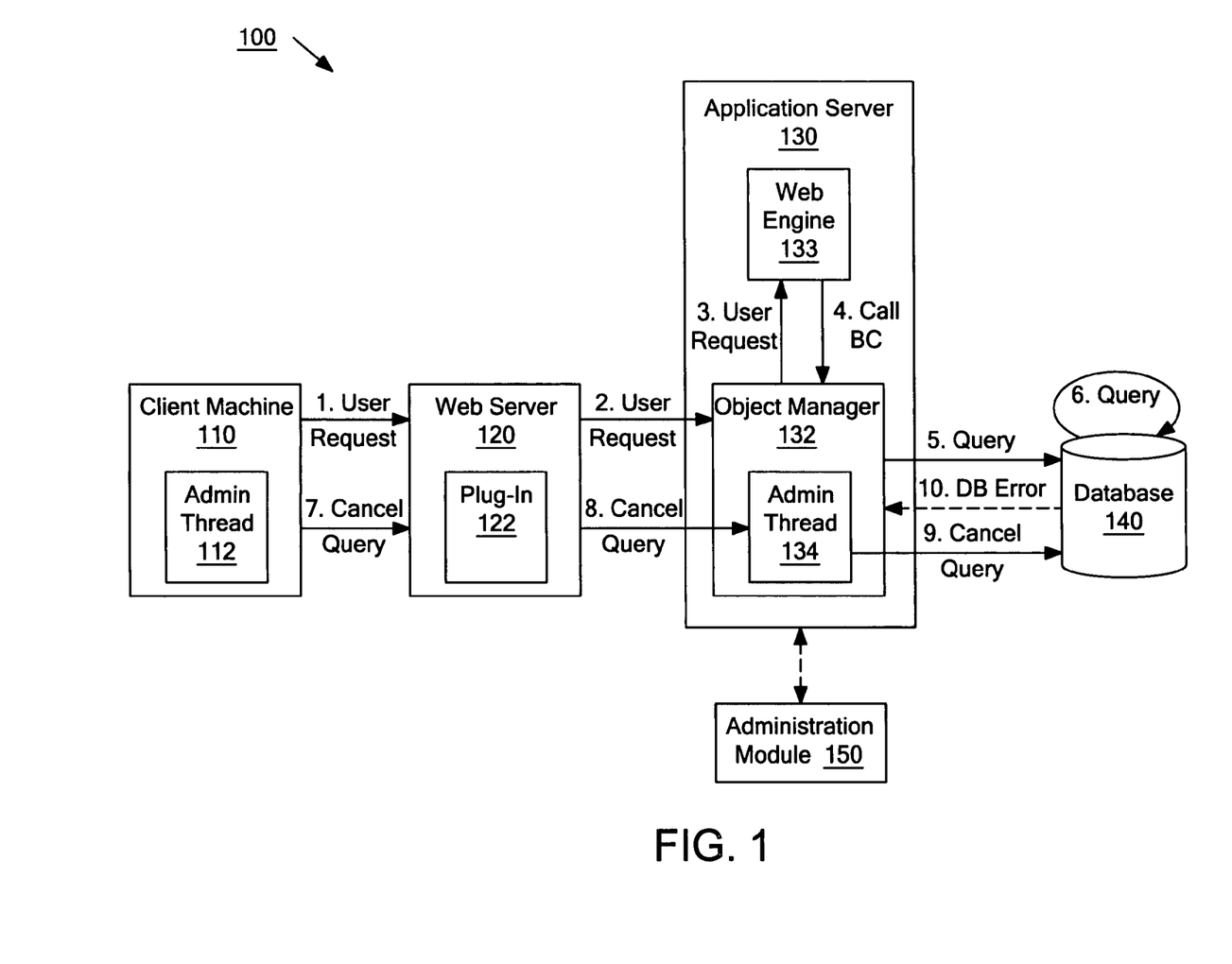
FIG. 1 illustrates an exemplary embodiment of a networked database system according to one embodiment of the present invention.

FIG. 1 illustrates an exemplary embodiment of a networked database system. The system 100 includes a client machine 110, a web server 120, an application server 130, and a database 140. The client machine 110 is coupled to the web server 120. The web server is coupled to the application server 130, which is coupled to the database 140. The client machine 110 may have a client application running, such as an Internet browser. Note that any or all of the components and the associated hardware and/or software illustrated in FIG. 1 may be used in various embodiments of the networked database system 100. However, it should be appreciated that other configurations of the networked database application may include one or more additional devices not shown in FIG. 1, such as additional client machines, web servers, or application servers.

A high-level overview of one embodiment of a process to submit a database query in response to a user request is described as follows. Via the browser running on a client machine 110, a user may input a request to run a database query. The client machine 110 may send the user request to the web server 120 (arrow 1). Then a plug-in application 122 running on the web server 120 sends the user request to the application server 130 (arrow 2). The application server 130 may include an object manager (OM) 132 and a web engine (WE) 133. The OM 132 may send the user request to the WE 133 (arrow 3). In response to the user request, the WE 133 may issue an instruction or command (e.g., call BusComp (Business component)) to the OM 132 to cause the OM 132 to submit a query to the database 140 (arrow 4). Then the OM 132 may submit a query to the database 140 (arrow 5), which may execute statements related to the query (arrow 6).

Referring back to the client machine 110, the client application running on the client machine 110 may monitor the user request to determine if the user request is cancelable. In one embodiment, the client application checks the global and application level configuration, as well as the name of the request to determine whether or not the request is cancelable.

If the request is cancelable, the client application may obtain a critical section to prevent concurrent outstanding cancelable requests. Then the client application sets a flag, such as a "REGISTER" event, to a dedicated administration thread 112 running on the client machine 110 before submitting the user request to the web server 120. Likewise, when the response to the user request has arrived at the client machine 110, the client application may reset the flag or set another flag, such as an "UNREGISTER" event, to the administration thread 112. The client application sends the user request (arrow 1) with a unique identification to the web server 120.

Figure 2:
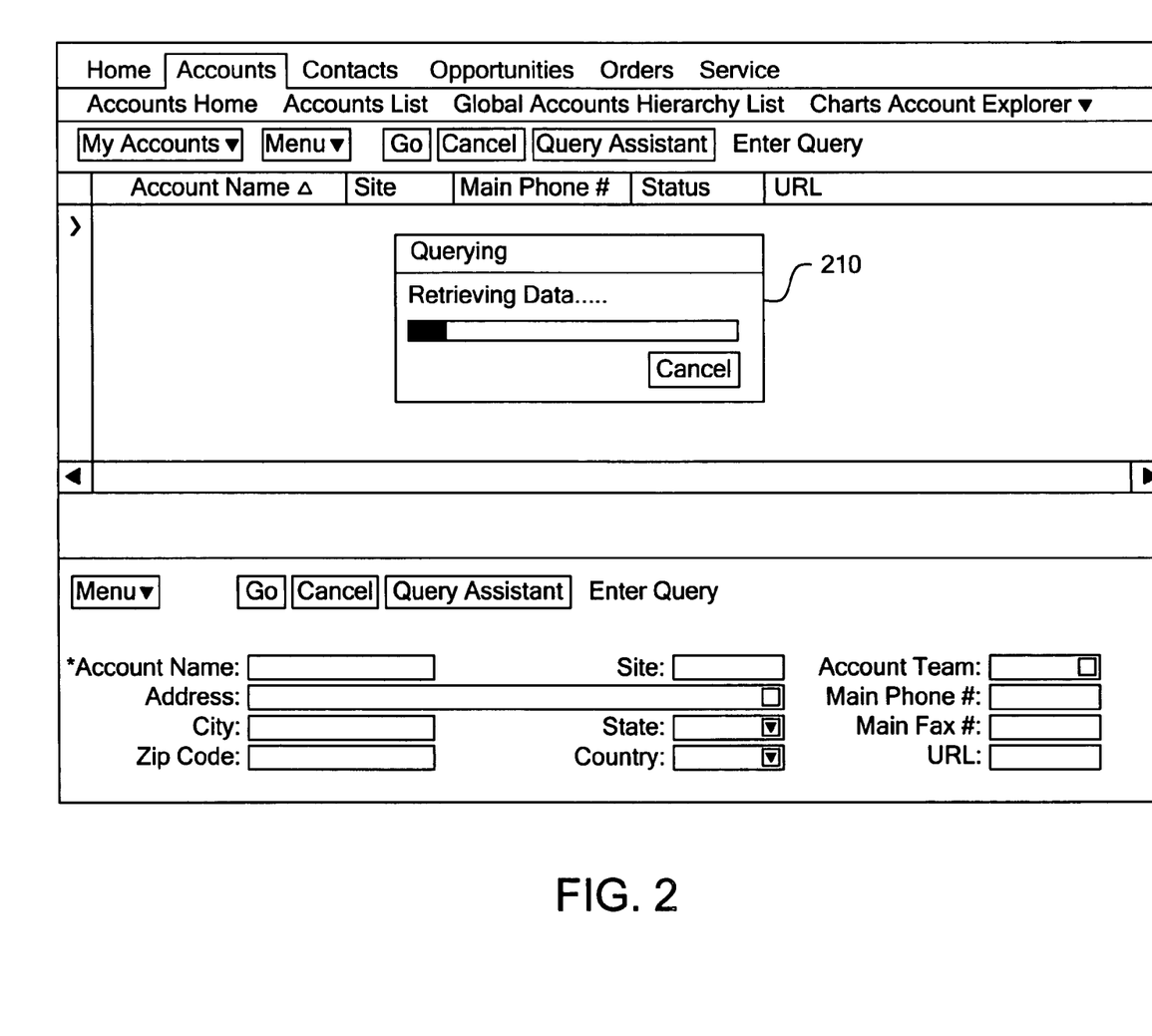
FIGS. 2-3 illustrate exemplary embodiments of user interfaces according to one embodiment of the present invention.

The administration thread 112 may be a dedicated background thread running on the client machine 110. In one embodiment, the administration thread 112 starts monitoring the cancelable request after receiving the "REGISTER" event. A graphical user interface (GUI), such as a cancel-query dialog box, may be displayed after a predetermined period of time has passed since the submission of the request if the "UNREGISTER" event has not occurred yet. An example of the cancel-query dialog box 210 is illustrated in FIG. 2. In one embodiment, the predetermined period of time is configurable. For example, a value may be assigned to a parameter in a configuration file to indicate how long this period is in seconds. In one embodiment, this parameter is also used as a flag to disable the query cancellation feature. For instance, the flag may be set to a negative value (e.g., −1) to disable the query cancellation feature.

As mentioned above, the user may choose to cancel the query via the cancel-query dialog box. If the user chooses to cancel the query, the client application sends a request containing the unique identification from the background (arrow 7). In one embodiment, the client application remembers the unique identification during the "REGISTER" event. This request may have a predetermined "administrative" format.

In one embodiment, the cancelable requests are serialized, and thus, there is only a single "REGISTER" event at a given time.

Figure 3:
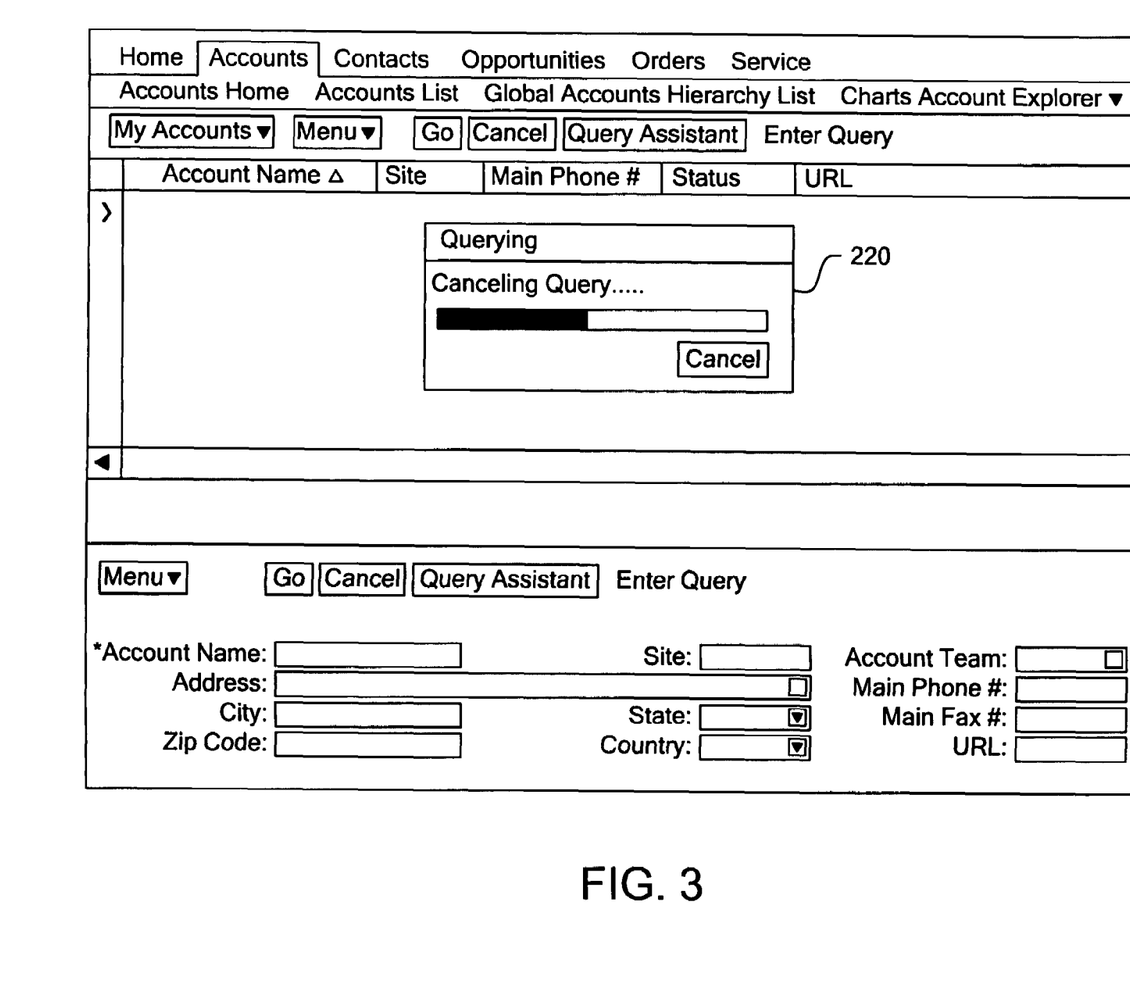

In one embodiment, to prevent unintended user actions from interfering with the cancellation of query, the client application disables the user interface controls and the accelerator keys until the query has been canceled. For example, the user may not be allowed to close the browser window by the "X" control button while a query and/or the operations related to the query are still running in the database or the servers, respectively. FIG. 3 illustrates an exemplary user interface displayed while a query is being canceled. In FIG. 3, the dialog box 220 indicates that the query is being canceled and the "cancel" button is disabled. In one embodiment, the dialog box 220 is closed in response to the confirmation that the server has completed the cancellation of the query arrives at the client machine. Alternatively, the dialog box 220 is closed in response to the user selecting the "cancel" button in FIG. 2.

Referring back to FIG. 1, the plug-in application 122 may extract the unique identification from the cancel query request when the web server 120 receives the request to cancel the query. Then the plug-in application 122 may pass the extracted identification to the application server 130.

When the cancel query request with the unique identification arrives from the client machine 110, the plug-in application 122 may recognize this request. In response to this request, the plug-in application 122 may pass the extracted identification to an administration thread 134 of the OM 132 running on the application server 130 (arrow 8). The plug-in application 122 may invoke the cancel query application programming interface (API) provided by the administration thread 134 of the OM 132 with information related to the query to be canceled. In one embodiment, an administrative thread in the OM 132 sends an instruction (arrow 9) to the database 140 to cause the database 140 to cancel the statements related to the query.

After canceling the statements related to the query (arrow 6) on the database 140, the database 140 sends a notification (arrow 10) to the OM 132, which may be passed onto the client machine 110 via the application server 130 and the web server 120.

In an alternate embodiment, the client machine 110 allows the user to send a cancel-query request without an identification of a target query to be canceled. In response to this cancel-query request, the plug-in application 122 invokes the cancel query API provided by the OM 132 to cancel all pending queries submitted by the user.

The above embodiments include a database 140 that supports query cancellation through communication. However, in some alternate embodiments, the database 140 does not support query cancellation through communication. Therefore, to allow a user to cancel query, the application server 130 may close the connection between the database 140 and the application server 130 for the query that the user wants to cancel. Once the connection is closed, the database 140 is forced to stop the statements running in the database 140 for the query that uses the closed connection. The application server 130 then re-opens the connection and sends an error message via the web server 120 to the client machine 110 to confirm the cancellation of the query.

In an alternate embodiment, the system 100 includes an administration module 150 to monitor the application server 130. If the administration module 140 detects that the database 140 has not provided any response to a query has been submitted for a predetermined period, then the administration module 134 may cause the OM 132 to send a cancel query request to the database 140 to cancel this query without waiting for a user submitting a cancel-query request.

Figure 4:
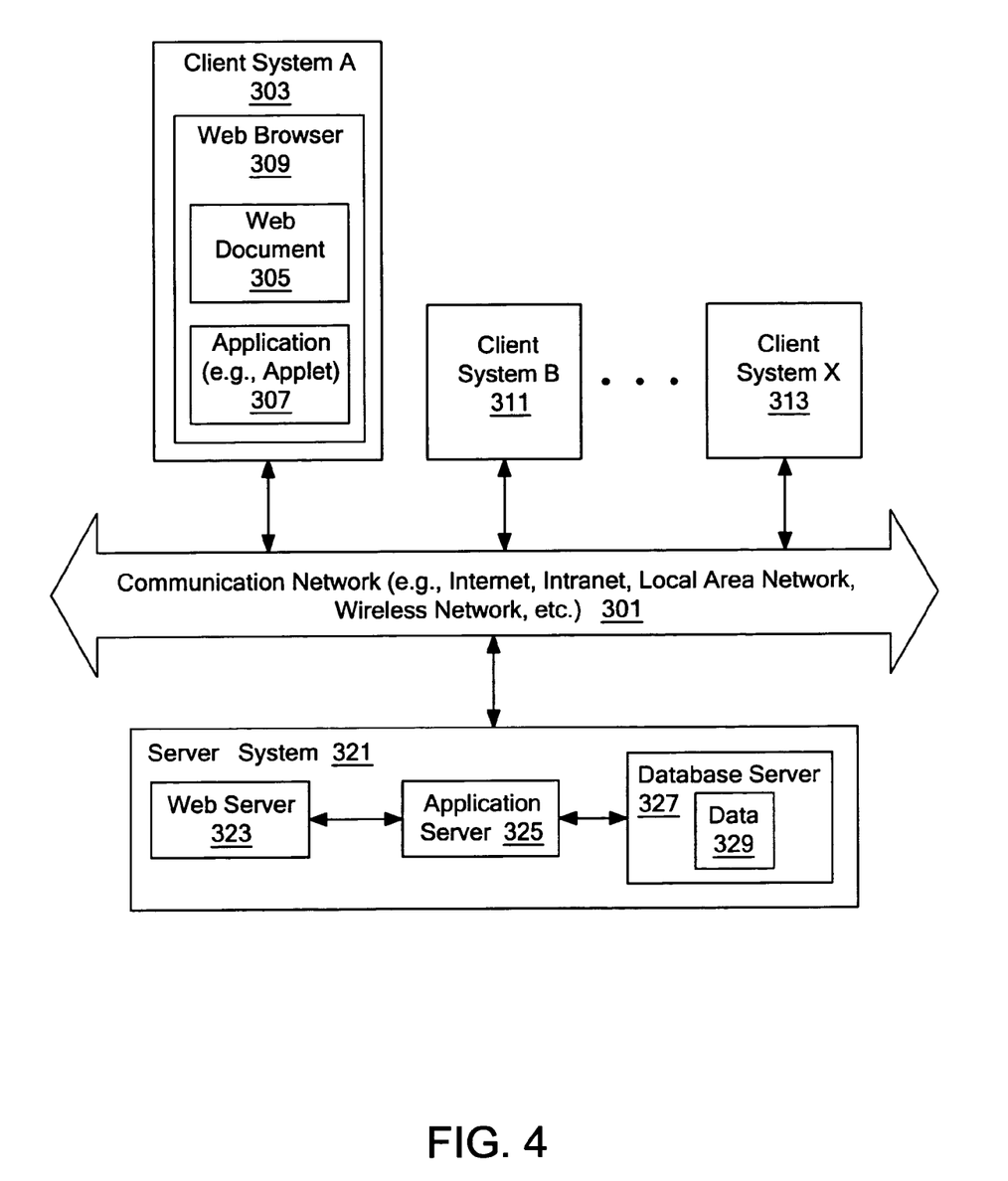
FIG. 4 shows an example of a web based database application according to one embodiment of the present invention.

FIG. 4 shows an example of a web based database application according to one embodiment of the present invention. In FIG. 4, a client system, such as client system A (303), client system B (311) and client system X (313), etc., communicates with an application server 325 through a web server 323 over a communication network 301, such as Internet, intranet, local area network, wireless network, etc.

In FIG. 4, the user interfaces to the application server 325 are presented as web documents through the web server 323. The application server 325 uses a database server 327 to maintain data 329.

In one embodiment, the server system 321 includes a network of computers (e.g., inter connected through a local area network). The web server, application server and database server may be hosted on different computers. Alternatively, some or all of the web server, application server and database server may be hosted on one computer. Furthermore, some or all of the web server, application server, and database servers may be integrated as one combined server. Thus, it is appreciated that various different arrangements of the servers can be used in embodiments of the present invention.

In FIG. 4, the client system 303 has a web browser 309, which renders a web document 305 that is received from the web server 323 to access the application server 325. When rendered in the web browser 309, the web document 305 causes the web browser to run an application 307 (e.g., applet) and display a user interface. In one embodiment, scripts embedded in, or linked to, the web document are executed as an applet running inside the web browser.

In one embodiment, the application running in the web browser includes a thread to manage user input and the aspects of cancellation of a previously submitted query while another thread is waiting for the result of the query. Alternatively, an event loop may be used to allow one application thread to alternating between waiting for the result of the query and managing the user interface for query cancellation.

Alternatively, the web document may be a static HTML (Hypertext Markup Language) document with embedded data from the server system 321 and forms to collect data for submission to the server system; and the web server 323 provides appropriate web documents for user interaction. For example, when a query is submitted, an HTML document sent from the web server to the browser may contain a link, or a button, which can be selected to submit the cancellation request; and a portion of the HTML document is linked to the response for the query result. For example, the user interface for query cancellation can be arranged in one frame and the pending query result in another frame.

From this description, a person skilled in the art can envision various different arrangements for the user interface to accept user input and submit query cancellation request, using HTML user interface elements and/or scripts and/or plug-ins in web browsers. Typically, a general-purpose web browser is used. However, special-purpose web browsers can also be used.

Figure 5:
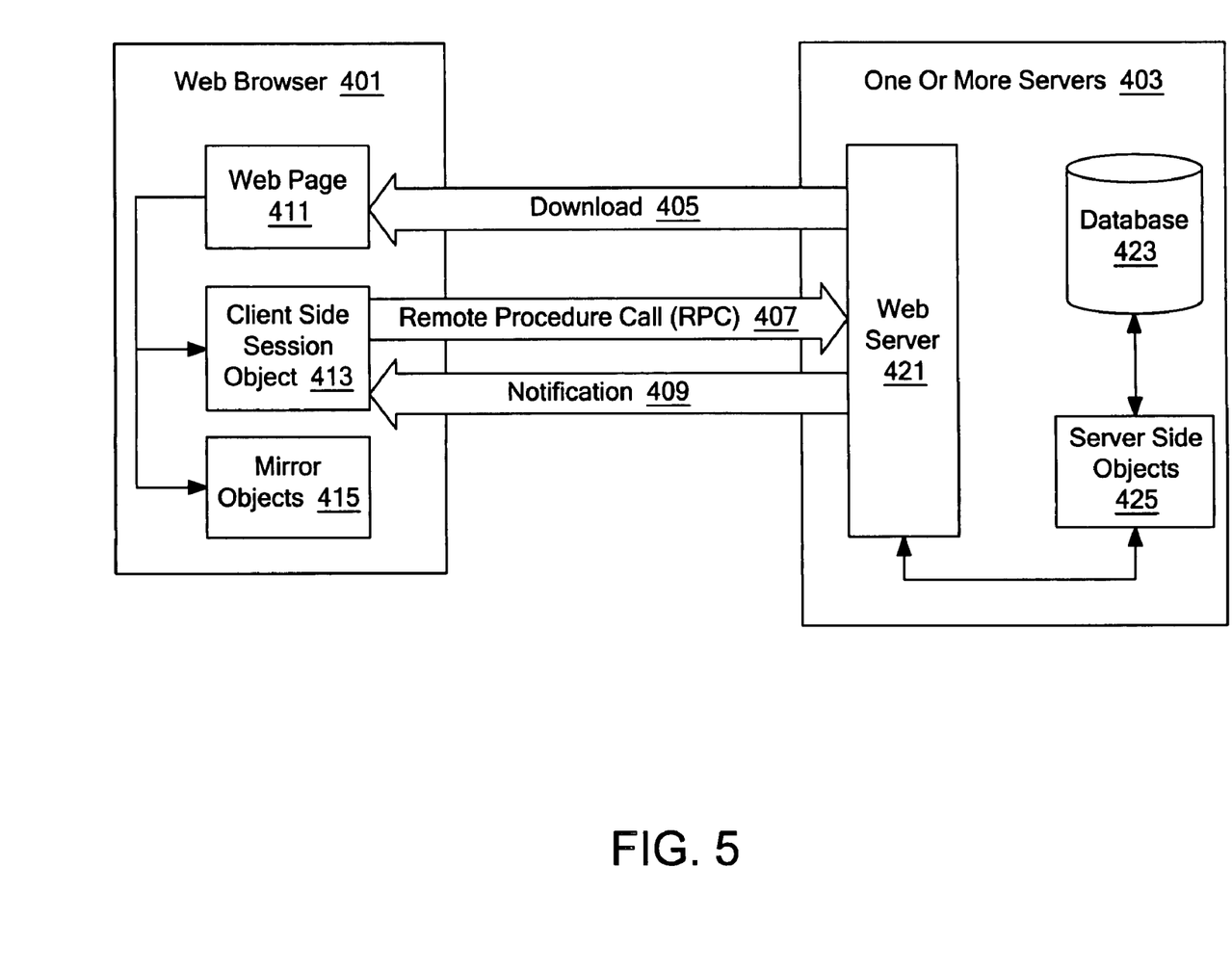
FIG. 5 shows a further example of a web based database application according to one embodiment of the present invention.

FIG. 5 shows a further example of a web based database application according to one embodiment of the present invention. In FIG. 5, the web-based application has a highly interactive user interface in the web browser 401. After the web page 411 is downloaded 405 from the web sever 421, a client side session object 413 is generated from the web page 411. In one embodiment, the objects in the web browser are generated from rendering the scripts of the web page 411. The client side session object 413 facilities the communication between the client side objects and the server side objects 425.

The server side objects 425 are created for the application session for the user of the web browser 401. The server side objects 425 use the database 423 to manage data. In one embodiment, an object manager running in one or more servers 403 manages the server side objects 425 for the application session. In one embodiment, a web engine is used with the object manager to create objects for performing business logic processing, organizing data views for the user interface in the web browser, and facilitating data communication between the client side objects and the server side objects, etc.

In one embodiment, the client side objects include mirror objects 415 which mirror the server side objects 425. The client side objects forward calls to the corresponding server side objects through remote procedure call (RPC) 407. The sever side objects 425 sends notification 409 to the mirror objects. In one embodiment, the client side session object packages the RPC as HTTP requests to the web server 421; and the web server 421 packages the notifications as HTTP responses to the client side session object 413.

Through the data communication between the client side objects and the server side objects, responses to user input can be made rapidly without having to refresh the entire web page. For example, when a user enters a data entry in the user interface, the data can be sent to the server for validation and for storage in the database. If there is an error, the user can be informed without having to upload the entire form to the server and waiting for an updated page. Thus, the user interface is highly interactive, since the web browser does not have to load and render a new web page for each user interaction.

In one embodiment, a query cancellation capability is implemented in the system of FIG. 5. When a query is requested, a unique ID is assigned to the query to identification. Using the client side session object 413, a remote procedure call is made to a corresponding server side object. The server side object then begins a database query (e.g., generating one or more SQL (Structured Query Language) statements for execution by the database 423).

When the query is cancelable, the application session running in the web browser presents a user interface element (e.g., a cancel button in a dialog box) to accept a user request to cancel the query activities in the one or more servers (403).

In one embodiment, if the user requests to cancel the query, the client side session object is used to place a remote procedure call 407 so that the one or more servers can stop the corresponding query activities on the server and/or the database.

In one embodiment, a client side object and a server side object communicate with each other periodically to verify that a connection between the web browser and the one or more servers for the application session is not broken. When the server object detects that the connection for the application session is broken (e.g., when the user closes the browser window to close the application session), the server object can begin to cancel the query activities on the server(s) and/or the database for the application session.

Figure 6:
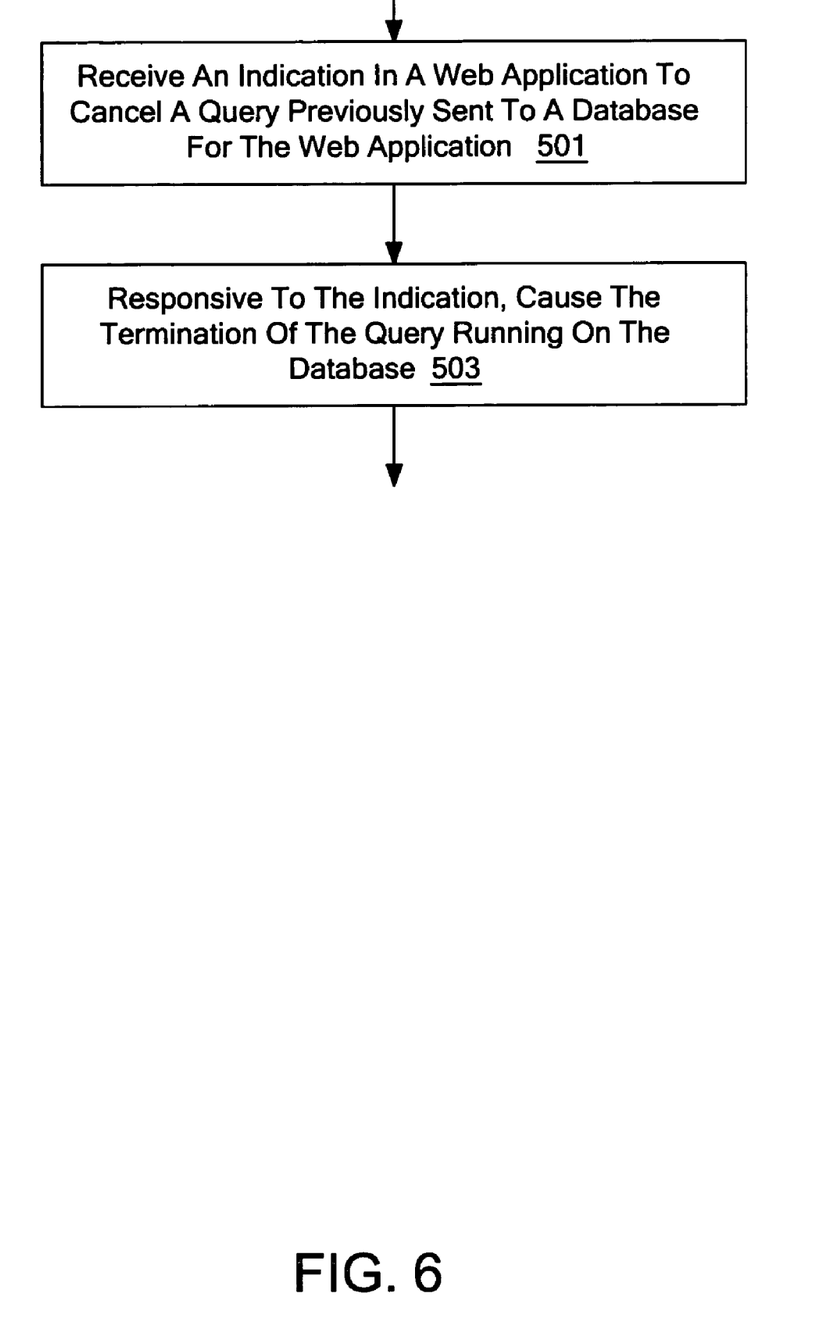
FIG. 6 shows a method to cancel query according to one embodiment of the present invention.

FIG. 6 shows a method to cancel query according to one embodiment of the present invention. Operation 501 receives an indication in a web application to cancel a query previously sent to a database for the web application. In one embodiment, the indication is received as a user input to a web application user interface presented in a web browser. In another embodiment, the indication is responsive to a detection of the loss of a connection to the web application user interface (e.g., when the user closes the web browser).

Responsive to the indication, operation 503 causes the termination of the query running on the database. For example, the termination of the query may be caused by calling an application programming interface (API) provided by the database to cancel the query, by closing a communication connection to the database to cancel the query, or by transmitting a message to a remote server which performs operations to terminate the query on the database.

Figure 7:
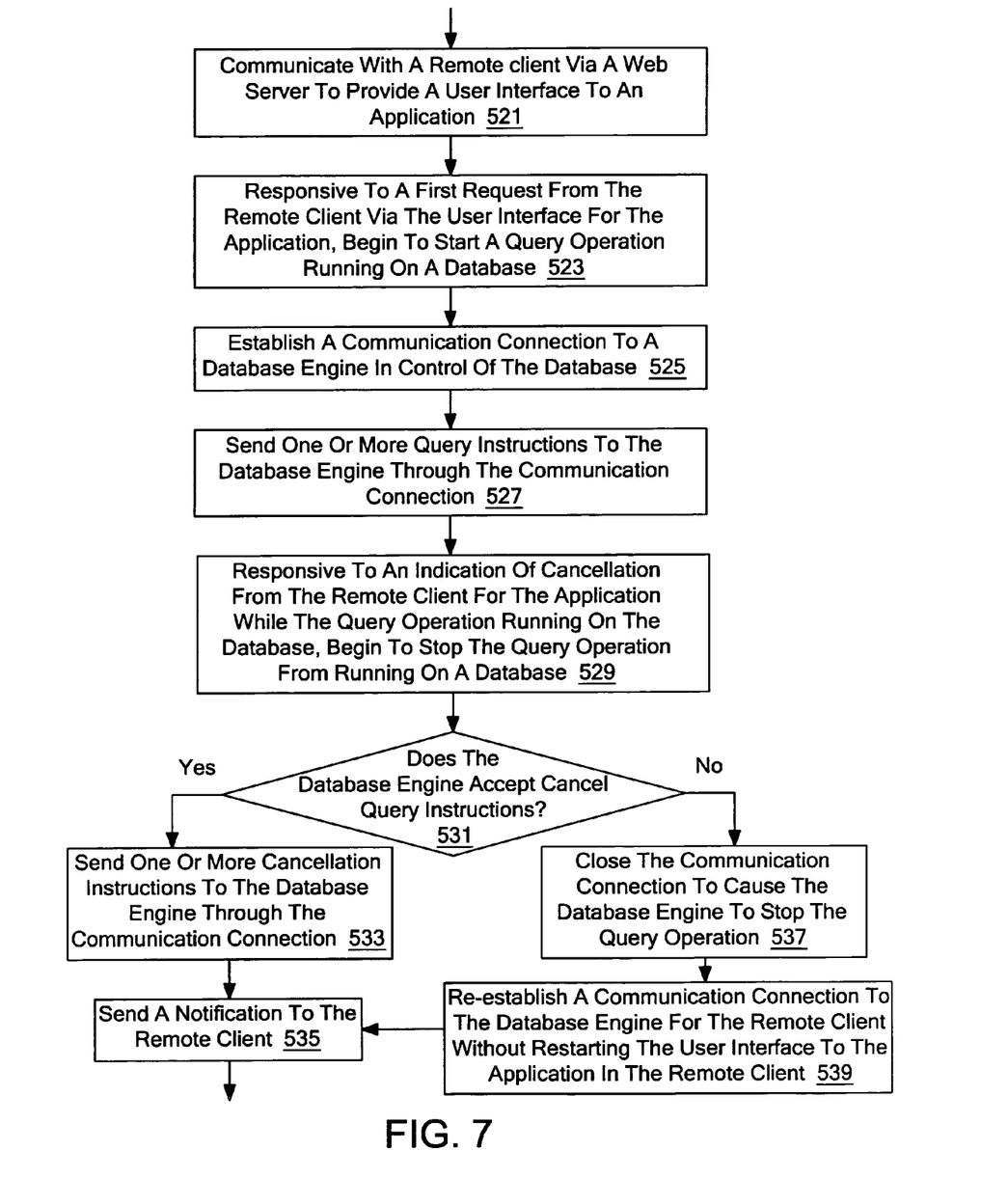
FIG. 7 shows a flow chart of a web based application server to submit and cancel a query according to one embodiment of the present invention.

FIG. 7 shows a flow chart of a web based application server to submit and cancel a query according to one embodiment of the present invention.

In FIG. 7, operation 521 communicates with a remote client via a web server to provide a user interface to an application. Responsive to a first request from the remote client via the user interface for the application, operation 523 begins to start a query operation running on a database.

Operation 525 establishes a communication connection to a database engine in control of the database. Operation 527 sends one or more query instructions to the database engine through the communication connection.

Responsive to an indication of cancellation from the remote client for the application while the query operation running on the database, operation 529 begins to stop the query operation from running on a database.

If operation 531 determines the database engine accepts cancel query instructions, operation 533 sends one or more cancellation instructions to the database engine through the communication connection.

If operation 531 determines the database engine does not accept cancel query instructions, operation 537 closes the communication connection to cause the database engine to stop the query operation. Operation 539 re-establishes a communication connection to the database engine for the remote client without restarting the user interface to the application in the remote client.

After the query on the database is canceled, operation 535 sends a notification to the remote client to confirm the completion of the cancellation.

In one embodiment, the query cancellation is in response to the user input at the web application user interface. Query cancellation can also be performed when the server detects that the application session in the remote web browser is closed, or when the server determines that the query takes a time period longer than a threshold.

Figure 8:
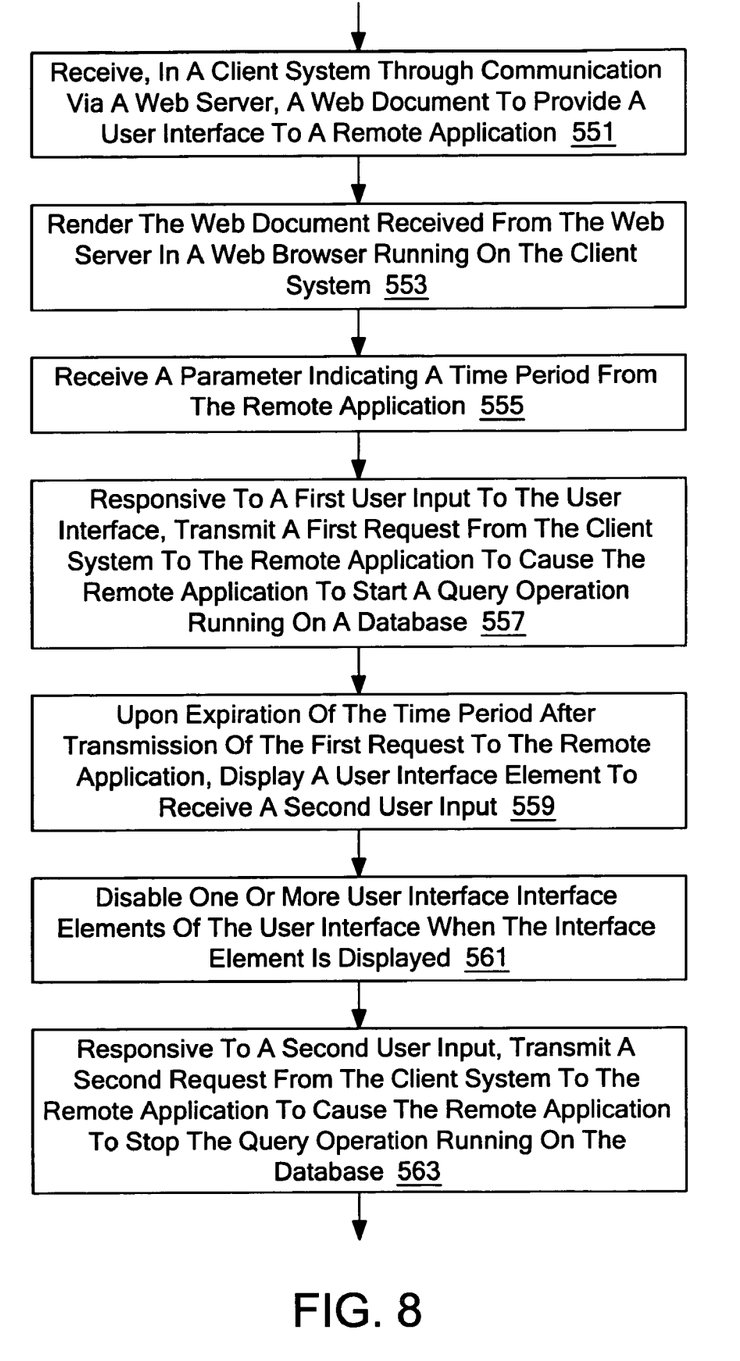
FIG. 8 shows a flow chart of a client of a web-based application to submit and cancel a query according to one embodiment of the present invention.

FIG. 8 shows a flow chart of a client of a web-based application to submit and cancel a query according to one embodiment of the present invention.

In FIG. 8, operation 551 receives, in a client system through communication via a web server, a web document to provide a user interface to a remote application. Operation 553 renders the web document received from the web server in a web browser running on the client system. Operation 555 receives a parameter indicating a time period from the remote application.

Responsive to a first user input to the user interface, operation 557 transmits a first request from the client system to the remote application to cause the remote application to start a query operation running on a database. Upon expiration of the time period after transmission of the first request to the remote application, operation 559 displays a user interface element to receive a second user input. The second user input is for the cancellation of the query submitted in the first request.

Operation 561 disables one or more user interface elements of the user interface when the interface element is displayed. For example, a dialog box can be presented; and one or more user interface elements for closing the application session are disabled, such as a button to close a browser window. Further, user interface elements for requesting further queries may be disabled temporarily.

Responsive to a second user input, operation 563 transmits a second request from the client system to the remote application to cause the remote application to stop the query operation running on the database.

Many of the methods of the present invention may be performed with a digital processing system, such as a conventional, general-purpose computer system. Special purpose computers, which are designed or programmed to perform only one function, may also be used.

Figure 9:
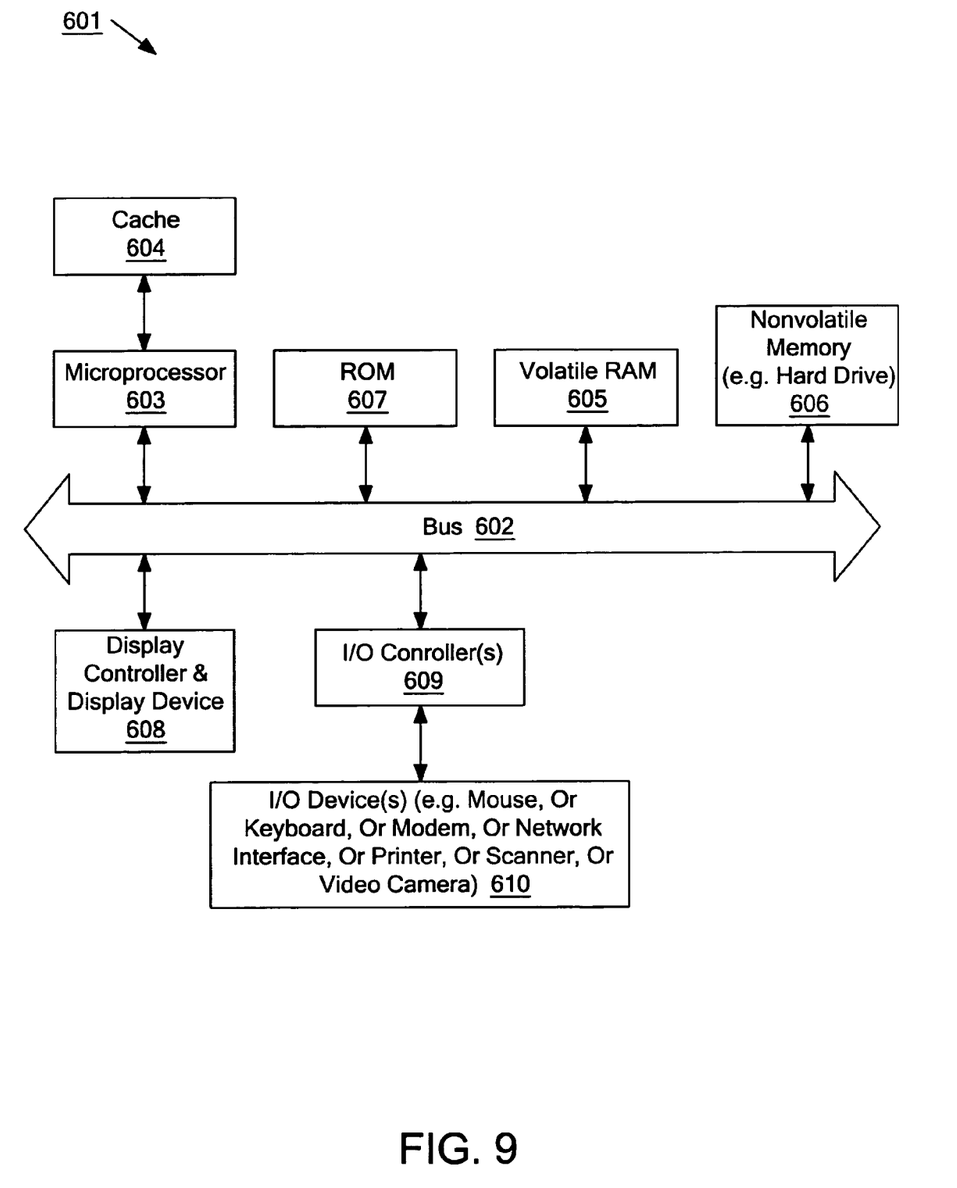
FIG. 9 shows a block diagram example of a data processing system which may be used with the present invention.

FIG. 9 shows one example of a typical computer system which may be used with the present invention. Note that while FIG. 9 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 9 may, for example, be a server in a server rack, a workstation, or a personal computer (PC), a handhold computer, etc.

As shown in FIG. 9, the computer system 601, which is a form of a data processing system, includes a bus 602 which is coupled to a microprocessor 603 and a ROM 607 and volatile RAM 605 and a non-volatile memory 606.

The microprocessor 603 is coupled to cache memory 604 as shown in the example of FIG. 9. The bus 602 interconnects these various components together and also interconnects these components 603, 607, 605, and 606 to a display controller and display device 608 and to peripheral devices such as input/output (I/O) devices which may be mice, keyboards, modems, network interfaces, printers, scanners, video cameras and other devices which are well known in the art.

Typically, the input/output devices 610 are coupled to the system through input/output controllers 609.

The volatile RAM 605 is typically implemented as dynamic RAM (DRAM) which requires power continually in order to refresh or maintain the data in the memory. The non-volatile memory 606 is typically a magnetic hard drive or a magnetic optical drive or an optical drive or a DVD RAM or other type of memory systems which maintain data even after power is removed from the system. Typically, the non-volatile memory will also be a random access memory although this is not required.

While FIG. 9 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface.

The bus 602 may include one or more buses connected to each other through various bridges, controllers and/or adapters as is well known in the art. In one embodiment the I/O controller 609 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 607, volatile RAM 605, non-volatile memory 606, cache 604 or a remote storage device.

In various embodiments, hardwired circuitry may be used in combination with software instructions to implement the present invention. Thus, the techniques are not limited to any specific combination of hardware circuitry and software nor to any particular source for the instructions executed by the data processing system.

In addition, throughout this description, various functions and operations are described as being performed by or caused by software code to simplify description. However, those skilled in the art will recognize what is meant by such expressions is that the functions result from execution of the code by a processor, such as the microprocessor 603.

Some portions of the above detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has been proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein.

A machine-readable storage medium includes any mechanism for storing or transmitting information in a form readable by a machine (e.g., a computer). For example, a machine-readable storage medium includes read only memory ("ROM"); random access memory ("RAM"); magnetic disk storage media; optical storage media; and flash memory devices.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine readable storage medium containing executable computer program instructions which when executed by a digital processing system cause the system to perform a method, comprising:
    responsive to receiving a first request via a user interface for an application, starting to execute a query operation on a database;
    monitoring for an indication of cancellation during execution of the query operation on the database;
    responsive to receiving the indication of cancellation, determining whether the database accepts cancel query instructions during execution of the query operation on the database;
    in response to a determination that the database does not accept a cancel query instruction during execution of the query operation on the database,
        determining whether the indication of cancellation is a closing of a communication connection between the application and the database, and
        in response to the determining that the indication of cancellation is the closing of the communication connection between the application and the database,
            stopping the query operation, and
            re-establishing the communication connection; and
    in response to a determination that the database does accept the cancel query instruction during the execution of the query operation on the database, sending at least one cancellation instruction to the database to stop the execution of the query operation on the database.

2. The machine readable storage medium of claim 1, wherein the indication of cancellation comprises receiving a second request from a remote client for the application.

3. The machine readable storage medium of claim 2, wherein the method further comprises:
    establishing the communication connection to a database engine of the database; and
    wherein the starting to execute the query operation comprises:
    sending one or more query instructions to the database engine through the communication connection.

4. The machine readable storage medium of claim 3, wherein the stopping the query operation comprises:
    sending one or more cancellation instructions to the database engine through the communication connection.

5. The machine readable storage medium of claim 2, wherein the first and the second requests are received from the remote client via the web server.

6. The machine readable storage medium of claim 2, wherein the indication of cancellation from the remote client comprises a broken communication link to the user interface in the remote client.

7. The machine readable storage medium of claim 2, wherein the user interface comprises an applet running in a web browser on the remote client.

8. The machine readable storage medium of claim 7, wherein the method further comprises:
sending a parameter indicating a time period to the web browser wherein, upon expiration of the time period after the first request, the applet is configured to display a user interface element to receive the second request for the indication of cancellation.

9. The machine readable storage medium of claim 8, wherein the user interface element is not displayed between transmission of the first request from the web browser and the expiration of the time period.

10. The machine readable storage medium of claim 9, wherein the user interface element comprises a button in a dialog box.

11. The machine readable storage medium of claim 8, wherein the applet is further configured to disable one or more user interface elements of the user interface when the interface element is displayed.

12. The machine readable storage medium of claim 11, wherein the one or more user interface elements comprise a user interface element configured to close a window containing the user interface.

13. A method, comprising:
responsive to receiving a first request via a web application user interface, starting execution of a query operation on a database;
monitoring for an indication of cancellation during execution of the query operation on the database;
responsive to the indication of cancellation, determining whether the database accepts cancel query instructions during execution of the query operation on the database;
in response to a determination that the database does not accept a cancel query instruction during execution of the query operation on the database,
determining whether the indication of cancellation is a closing of a communication connection between the application and the database, and
in response to the determining that the indication of cancellation is the closing of the communication connection between the application and the database,
causing the database to terminate execution of one or more statements on the database, the one or more statements being related to the query by stopping the query, and
re-establishing the communication connection; and
in response to a determination that the database does accept the cancel query instruction during the execution of the query operation on the database, sending at least one cancellation instruction to the database to stop the query operation on the database.

14. The method of claim 13, wherein causing the database to terminate the one or more statements comprises:
calling an application programming interface (API) provided by the database to cancel the query.

15. The method of claim 13, further comprising:
providing a web document to a web site for transmitting to a web browser which renders the web document to display the web application user interface;
wherein the query is previously sent to the database according to input received from the web application user interface.

16. The method of claim 13, wherein causing the database to terminate the one or more statements comprises:
transmitting a message to a remote server to cause the database to terminate execution of one or more statements on the database.

17. A data processing system, comprising:
a storage device, wherein
the storage device is configured to store a database;
a network interface device, wherein
the network interface device and the storage device are coupled to one another;
means for starting execution of a query operation on the database, wherein
the means for starting execution is responsive to a first request received from a web application user interface at the network interface device;
means for monitoring for an indication of cancellation during execution of the query operation on the database;
means for determining whether the database accepts cancel query instructions during execution of the query operation on the database, wherein
the means for determining is responsive to the indication of cancellation;
means for determining whether the indication of cancellation is a closing of a communication connection between the application and the database, in response to determining that the database does not accept a cancel query instruction, wherein
the means for determining whether the indication of cancellation is closing of the communication connection further comprises
means for stopping the query operation, in response to the determining that the indication of cancellation is the closing of the communication between the application and the database, and
means for re-establishing the communication connection, in response to the determining that the indication of cancellation is the closing of the communication between the application and the database; and
means for sending at least one cancellation instruction to the database to stop the query operation execution at the database on which the query operation is being executed, in response to determining that the database does accept the cancel query instruction during execution of the query operation on the database.

* * * * *